UNITED STATES PATENT OFFICE.

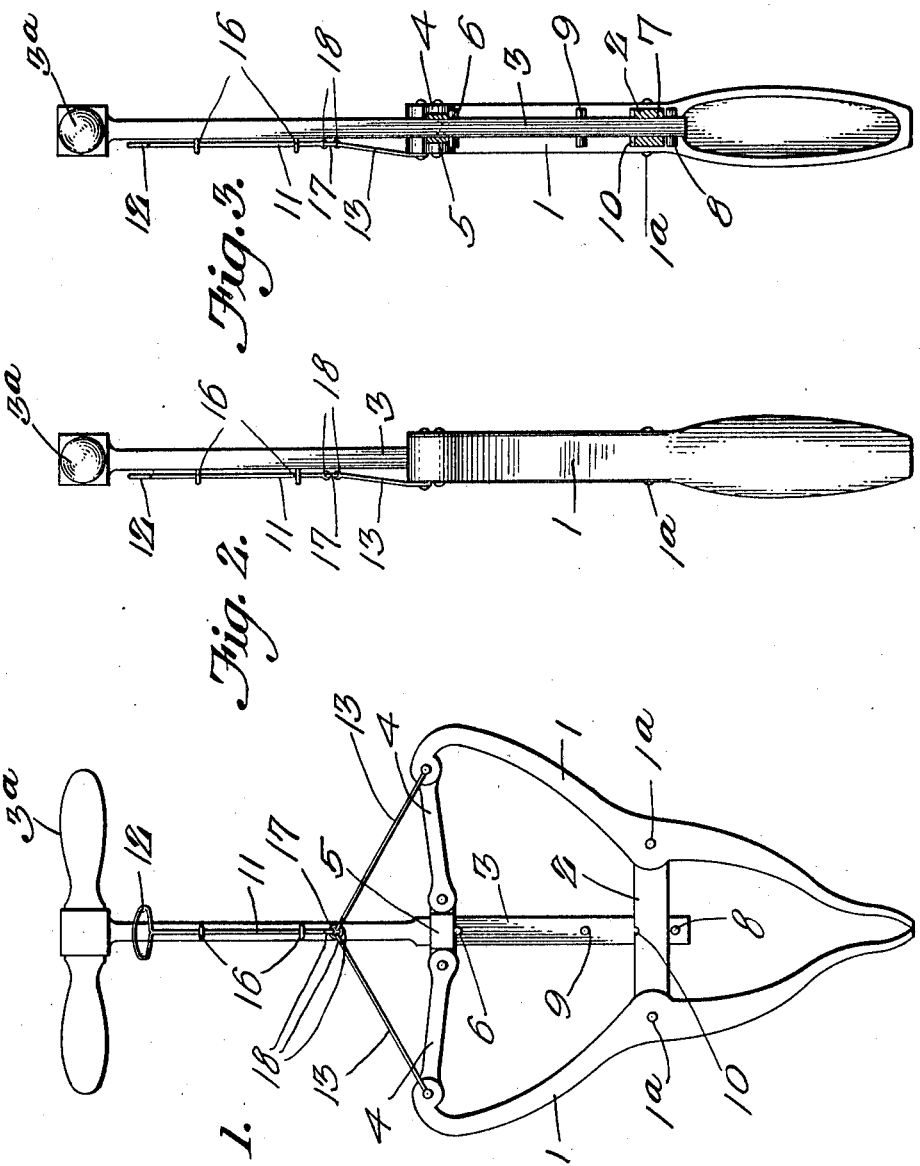

GARNETT G. McTAGGART, OF RENO, NEVADA.

WEEDER.

1,022,103. Specification of Letters Patent. Patented Apr. 2, 1912.

Application filed July 14, 1911. Serial No. 638,541.

*To all whom it may concern:*

Be it known that I, GARNETT G. McTAGGART, a citizen of the United States, residing at Reno, in the county of Washoe and State of Nevada, have invented a new and useful Weeder, of which the following is a specification.

This invention pertains to improvements in devices for extracting or pulling weeds.

The invention has for its object to effect the weed extracting or pulling operation with facility and expedition.

A further object is to greatly simplify the construction and arrangement of the parts.

A still further object is to carry out the aforesaid ends in an inexpensive and effective manner.

The invention consists of certain instrumentalities and features substantially as hereinafter disclosed and defined by the claims.

In the accompanying drawing illustrating the preferred embodiment of my invention wherein it will be understood that various changes and modifications as relate to the detailed construction and arrangement of the parts may be made without departing from the spirit of the invention,—Figure 1 is an elevational view of my weed-extracting implement or device with the extracting jaws in closed position. Fig. 2 is an elevational view thereof at right angles to the plane of Fig. 1. Fig. 3 is a sectional elevation of the same taken in a corresponding plane.

In carrying out my invention, I employ two opposed jaws or members 1, counterparts or duplicates of each other, a transverse member 2 to which are suitably pivoted as at 1ᵃ, the members or jaws 1, intermediate their ends, a handle-equipped vertical or central member 3, its handle being designated at 3ᵃ, and two articulated link members 4, further described presently.

The jaws or members 1 have their lower or weed-engaging ends adapted preferably as shown for suitably effecting that purpose while the jaws themselves are preferably dished or concaved upon their inner opposed surfaces for obvious reasons. Said jaws or members are preferably outwardly curved or bowed toward their upper ends, to which ends are pivoted the outer ends of the links 4, the opposite ends of said links being pivoted to a collar or sleeve 5 slidable upon the member 3. The movement of the sleeve or collar 5 is limited in a downward direction by an engaging lateral projection or stop 6 on the member 3 which latter also provides for intermediate engagement between the collar and member 3.

The member 2 has a central orifice or opening 7 through which extends the member 3 at or near its lower end, said end of said member 3 having a lateral stud or projection 8 to limit its relative upward movement by the engagement of the stud or projection with the member 2. The member 3 is also provided with a lateral stud or projection 9, standing initially a short distance above or beyond the member 2 and which stud or projection engages the latter member and which may enter a notch 10 in the upper edge or surface of said member, to provide for delivering the downward thrust or pressure exerted by the operator upon the member 3 to the jaws 1 through the member 2, as in forcing, or causing them to enter the ground and to the required depth for suitably engaging the weeds, as in extracting or pulling the same.

In order to enable the jaw-members to suitably enter the ground or in open position or separated, a preferably wire-member 11 is slidably mounted or supported upon the handled member or bar 3 and provided with a finger-hold 12, said member 11 being connected, by preferably two rod-members or links 13 to the jaw-members at the upper ends of the latter. In presenting the jaw-members to the ground, the finger-hold 12 of the wire-member 11 is suitably engaged, so as to effect the retention of the jaw members separated simultaneously with the thrusting of the said jaw-members into the ground, the jaw-members assuming closed or effective position as they enter the ground for engaging or grasping the weed, as will be readily appreciated.

The wire-member 11 is arranged to extend through keepers or guides 16 secured to the handled member 3 and has preferably ring and hook or loop connection with the rods or links 13, the ring being designated as 17, and the loops or hooks, which are formed in connection with the wire and rod members, being designated as 18, said ring being engaged by said loops or hooks, as seen particularly in Fig. 1. The supplemental actuating contrivance for holding the jaw-members in initial open position, including the wire-member 11 and links or rod-members 13, may also serve for actuating the extracting jaw-members more particularly in extracting or pulling quite small weeds.

With one hand applied to the handle 3ª and prior to putting the device into operation or inserting it into the ground, the finger-hold 12 is suitably engaged and pulled upwardly, which will so actuate the members 11 and 13, as to separate the jaws or members 1, at their lower ends. The device is then, by inserting suitable downward pressure upon said handle, thrust into the ground with respect to the weed or other object it may be desired to extract, the lateral projections 9 of the member 3 engaging the jaw-connecting member 2 at that time. As the points of the jaws enter the ground, the operator releases hold upon the finger-hold 12 when, as continued pressure is applied to the handle 3ª, the jaws, by the engagement of the latter with the ground, will be caused to approach each other and thus encompass the weed or object for its extraction. It will be seen that as an upward movement is exerted upon the handle 3ª, as in effecting the extracting operation, the jaws will still retain their hold upon the encompassed weed or object, the lateral stud or projection 6, during such movemnt of the parts engaging or forcing the collar 5 upwardly, together with the inner ends of the links or members 4, having the effect to hold the upper ends of the members or jaws 1 against inward movement and accordingly the lower ends thereof, or the jaws proper, from separating as long as upward movement is exerted upon the device.

It is considered that the advantages and benefits of my invention have been amply disclosed by the foregoing description taken in connection with the accompanying illustration or drawing, it being emphasized, however, that it is characterized for its extreme simplicity of construction, embracing but few parts, and is accordingly inexpensive of manufacture, while it is ready of application and effective in operation, the same being adapted especially for garden and lawn use, as well as for general use.

What is claimed is:

1. A device of the character described, including jaw-members for penetrating the ground, a handled member, intermediate connecting members between said jaws and handled member, one of said intermediate members being adapted to receive said handled member, the other intermediate members being pivoted to a sleeve receiving said handled member, said handled member having lateral stops engaging said sleeve and the first-referred to intermediate member.

2. A device of the class described, comprising opposed articulated jaws for insertion into the ground, a handled member having lateral stops thereon and intermediate connecting members between jaw-members and said handled member, including links and a sleeve, said links being connected to said jaw-members and said sleeve, said stops engaging said sleeve and an intermediate member directly.

In testimony that I claim the foregoing as my own, I have hereto affixed my signature in the presence of two witnesses.

GARNETT G. McTAGGART.

Witnesses:
E. A. WILLIAMS,
F. K. UNSWORTH.

Copies of this patent may be obtained for five cents each, by addressing the "Commissioner of Patents, Washington, D. C."